UNITED STATES PATENT OFFICE 2,284,067

MERCURATED ALIPHATIC ALCOHOLS

Anderson W. Ralston and Miles R. McCorkle, Chicago, Ill., assignors to Armour and Company, Chicago, Ill., a corporation of Illinois No Drawing. Application November 4, 1938, Serial No. 238,889

7 Claims. (Cl. 260—431)

This invention pertains to mercurated aliphatic alcohols, and it comprises as new materials mercurated aliphatic alcohols of the general formula

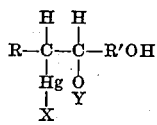

wherein R and R' are straight chain saturated or unsaturated alkyl groups, X is an acid radical such as halogen, cyano, nitro or acetate, and Y is hydrogen or an alkyl group containing five or less carbon atoms, it further comprises compounds of the above general formula wherein the group

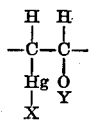

may be substituted for one or more —CH$_2$—CH$_2$— groups in the compound, it further comprises processes of preparing such mercurated alcohols wherein unsaturated aliphatic alcohols are reacted with mercuric salts, and it further comprises weed-killing compositions containing such mercurated alcohols as the effective ingredient.

Organic mercurials are substances of general interest and their use as germicides and antiseptics is well known. Those organic mercurials soluble in organic solvents, such as hydrocarbons, are of particular interest.

We have now discovered a class of organic mercury-containing compounds which are oil soluble and which can be easily prepared from unsaturated aliphatic alcohols. The products of the present invention can be classed as mercurated aliphatic alcohols and are characterized by the presence of the group

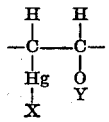

wherein X is an acid radical and Y is hydrogen or an alkyl group containing five or less carbon atoms. These compounds are generally heavy liquids or low melting solids insoluble in water but soluble in organic solvents such as ether, alchol, kerosene or benzene. The mercurated alcohols of the present invention are especially useful as herbicides as we shall presently describe.

The following examples of typical compounds falling in this group can be given:

EXAMPLE 1

*9-acetoxymercuri, 10-methoxy octadecan-18-ol*

32 grams of 9-octadecen-18-ol are prepared by the reduction of ethyl oleate with metallic sodium in butyl alcohol. The 32 grams of 9-octadecen-18-ol are placed in a three-necked flask equipped with a stirrer and reflux condenser. 43 grams of mercuric acetate and 140 cc. of methanol are now added and the mixture refluxed for ten hours with constant stirring. The reaction mixture is then poured into water and extracted with ether. The ether solution is then washed and dried with sodium sulfate. The solution is filtered and the ether evaporated. The product consists of 63 grams of a heavy, straw-colored oil, containing 35.5% of mercury. Analysis shows it to be 9-acetoxymercuri, 10-methoxy octadecan-18-ol or its isomer. We attribute the liquid nature of the product to the possible formation of equimolar proportions of the 9-methoxy, 10-acetoxymercuri isomer during the reaction.

EXAMPLE 2

*9-chloromercuri, 10-ethoxy octadecan-18-ol*

50 grams of 9-octadecen-18-ol are prepared as previously described and reacted in a three-necked flask with 54 grams of mercuric chloride and 150 cc. of ethyl alcohol. The mixture is refluxed for ten hours, poured into water and extracted with ether. 91 grams of a heavy oil are obtained which is 9-chloromercuri, 10-ethoxy octadecan-18-ol. The mercury content is 36.1%.

EXAMPLE 3

*1-acetoxymercuri, 2-methoxy undecan-11-ol*

50 grams of 1-undecen-11-ol are prepared by the reduction of ethyl undecylenate acid with sodium in butyl alcohol. The 50 grams of 1-undecen-11-ol are placed in a three-necked flask equipped with a reflux condenser and stirrer and mixed with 110 grams of mercuric acetate and 150 cc. of methanol. The mixture is refluxed for ten hours and treated as previously described. 140 grams of a heavy oil is obtained which contains 43.3% mercury and which complete analysis shows to be 1-acetoxymercuri, 2-methoxy undecan-11-ol.

EXAMPLE 4

9-acetoxymercuri, 10-butoxy docosan-22-ol 50 grams of 9-docosen-22-ol are prepared and treated as previously described with 57 grams of mercuric acetate and 100 cc. of butyl alcohol. The mixture is heated on a steam bath for ten hours. It is then poured into water and extracted with ether. 90 grams of a heavy oil is obtained which analysis shows to be 9-acetoxymercuric, 10-butoxy docosan-22-ol.

EXAMPLE 5

50 grams of unsaturated aliphatic alcohols are prepared by the reduction of the methyl esters of fish oil fatty acids with sodium in butyl alcohol. This alcohol was then refluxed with 64 grams of mercuric acetate and 150 cc. of methanol for ten hours. The product was isolated in the manner previously described. The yield amounts to 90 grams of a mercurated, unsaturated alcohol.

In the examples given above all of the mercurated aliphatic alcohols described are characterized by the presence of the group

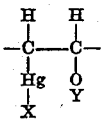

wherein X is an acid radial and Y is hydrogen or an alkyl group containing five or less carbon atoms. The general reaction for their preparation is as follows:

$R(CH_2)_x CH=CH(CH_2)_x OH + HgX_2 + YOH \longrightarrow$

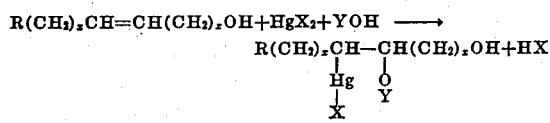

X may be any acid radical and a number of typical examples have been described. Thus X may be —Cl,

NO₃, etc. Y may be hydrogen or an alkyl group containing five or less carbon atoms. R is an alkyl chain or a methyl group at the end of an alkyl chain defined as $(CH_2)_x$. Thus, if the reaction is conducted in water the group OY will be hydroxyl and if the reaction is conducted in butyl alcohol the group OY will be butoxy. Any unsaturated alcohol having at least six carbon atoms in the hydrocarbon chain attached to the hydroxyl group can be used as the starting material.

These compounds are all insoluble in water but soluble in the usual organic solvents such as ether, alcohol, acetone, kerosene, etc. They show typical reactions of aliphatic alcohols and can be sulfated to give sulfuric esters possessing varying degrees of water solubility.

As stated above, these compounds are highly antiseptic and their use as germicides for the preparation of germicidal ointments and paints is indicated. We have further discovered that these mercurated aliphatic alcohols are powerful herbicides and that they possess a preferential killing power for weeds in the presence of grass. We have found that it is possible to treat lawns containing weeds with the proper concentration of these mercurated aliphatic alcohols so that the weeds are completely removed and the grass is not permanently injured. In order to accomplish this the mercurated alcohol is either dissolved in a hydrocarbon solvent, such as kerosene, or emulsified and the solution or emulsion sprayed over the area to be treated. Generally we prefer to use kerosene solutions and we have found that concentrations of the order of 0.5% of the mercurated aliphatic alcohol to be most specific in its killing power. Our experimental work showed satisfactory results with concentrations ranging from 0.001% to 1.0%. Where over-all killing of plant growth is desired, higher concentrations may be employed. We have found them to be specific for the removal of weeds having milk- or latex-containing roots, such as those belonging to the family of Compositae which includes thistles, dandelions, sunflowers; or those belonging to the family of Asclepiadaceae which includes milkweeds. We have found them to be especially useful in the control of weeds belonging to the genus Plantago. They are also useful for the eradication and control of the so-called "crab grass," which is a serious lawn pest in most localities. It is our belief that the root systems of the weeds being more porous specifically absorb the compounds and that the absorption by grass roots is of an entirely different order of magnitude so that when controlled amounts are sprayed, essentially all of the mercurial is absorbed by the weed roots.

Having thus described our invention, what we claim is:

1. Mercurated aliphatic alcohols having the formula RCH₂OH wherein R is a straight chain alkyl radical having at least five carbon atoms and having one of the group consisting of hydroxy and lower molecular weight alkyloxy attached to one carbon atom and having mercury attached to an adjacent carbon atom and to a radical of a soluble monobasic acid.

2. Mercurated aliphatic alcohols having the formula RCH₂OH wherein R is a straight chain akyl radical having seventeen carbon atoms and having one of the group consisting of hydroxy and lower molecular weight alkyloxy attached to one carbon atom and having mercury attached to an adjacent carbon atom and to a radical of a soluble monobasic acid.

3. 9-acetoxymercuri, 10-methoxy octadecan-18-ol.

4. 9-chloromercuri, 10-ethoxy octadecan-18-ol.

5. 1-acetoxymercuri, 2-methoxy undecan-11-ol.

6. The process which comprises refluxing an unsaturated aliphatic alcohol containing at least six carbon atoms in the hydrocarbon radical attached to the hydroxyl group with a soluble mercury salt of a soluble monobasic acid in the presence of a lower aliphatic saturated alcohol.

7. The process which comprises refluxing an unsaturated aliphatic alcohol having at least six carbon atoms in the hydrocarbon chain attached to the hydroxyl group with a soluble salt of mercury and a soluble monobasic acid in the presence of a lower saturated aliphatic alcohol containing not more than five carbon atoms.

ANDERSON W. RALSTON.
MILES R. McCORKLE.